(12) United States Patent
Cristea et al.

(10) Patent No.: US 8,360,709 B2
(45) Date of Patent: Jan. 29, 2013

(54) DEVICE FOR SELECTIVELY DISPENSING LIMESTONE FOR A REGENERATING OVEN AND PROCESS FOR SELECTIVELY LOADING LIMESTONE IN A REGENERATING OVEN USING SUCH DEVICE

(76) Inventors: Eugen Dan Cristea, Bergamo (IT); Oliviero Collarini, Basiglio (IT)

(*) Notice: Subject to any disclaimer, the term of this patent is extended or adjusted under 35 U.S.C. 154(b) by 284 days.

(21) Appl. No.: 12/955,866

(22) Filed: Nov. 29, 2010

(65) Prior Publication Data
US 2011/0070150 A1 Mar. 24, 2011

Related U.S. Application Data

(63) Continuation of application No. 11/908,552, filed as application No. PCT/IT2006/000178 on Mar. 22, 2006, now abandoned.

(30) Foreign Application Priority Data

Apr. 7, 2005 (IT) .............................. TO2005A0230

(51) Int. Cl.
*F27D 3/10* (2006.01)
(52) U.S. Cl. ......... 414/804; 414/153; 414/172; 414/206
(58) Field of Classification Search .......... 414/194–195, 414/153, 172, 174, 182, 204–206, 804
See application file for complete search history.

(56) References Cited

U.S. PATENT DOCUMENTS

| | | | |
|---|---|---|---|
| 3,799,368 A | 3/1974 | Wieczorek | |
| 4,243,351 A | 1/1981 | Legille et al. | |
| 5,460,517 A | 10/1995 | Scheibenreif et al. | |
| 5,755,837 A | 5/1998 | Beierle et al. | |

FOREIGN PATENT DOCUMENTS

| | | |
|---|---|---|
| EP | 0400309 A2 | 12/1990 |
| EP | 1439360 A1 | 7/2004 |

OTHER PUBLICATIONS

Cristea, et al., International Search Report and Written Opinion of the International Searching Authority dated Sep. 6, 2006 issued in the grandparent International Application No. PCT/IT2006/000178 filed Mar. 22, 2006.
Piringer, H., English Translation of EP 1439360A1, Jul. 21, 2004.
Tschinkel, F., English Translation of EP 0400309A2, Nov. 4, 1990.
Cristea et al., Office Action dated Jun. 22, 2009 issued in parent U.S. Appl. No. 11/908,552.
Cristea et al., Office Action dated Dec. 23, 2009 issued in parent U.S. Appl. No. 11/908,552.
Cristea et al., Office Action dated Jul. 7, 2010 issued in parent U.S. Appl. No. 11/908,552.
Cristea et al., Office Action dated Nov. 19, 2010 issued in parent U.S. Appl. No. 11/908,552.

*Primary Examiner* — Saul Rodriguez
*Assistant Examiner* — Jonathan Snelting
(74) *Attorney, Agent, or Firm* — David A. Farah; Sheldon Mak & Anderson PC

(57) ABSTRACT

A selective dispensing device (1) is disclosed for limestone in vats (5a, 5b) of a regenerating oven adapted to arrange limestone with greater sizes next to an external wall (7a, 7b) of the vats (5a, 5b) and limestone with smaller sizes next to an internal wall (8a, 8b) of the vats (5a, 5b), comprising at least one mobile bulkhead (11) connected to a drive shaft (13) rotating around a rotation axis (X), such rotation being driven by an actuator system and the mobile bulkhead (11) being able to rotate around the rotation axis X to be alternatively inclined by a first angle ($\alpha$) and by a second angle ($\beta$) with respect to reference plane (Z).

7 Claims, 3 Drawing Sheets

DEVICE FOR SELECTIVELY DISPENSING LIMESTONE FOR A REGENERATING OVEN AND PROCESS FOR SELECTIVELY LOADING LIMESTONE IN A REGENERATING OVEN USING SUCH DEVICE

CROSS-REFERENCE TO RELATED APPLICATIONS

The present application is a Continuation of U.S. patent application Ser. No. 11/908,552, titled "Device for Selectively Dispensing Limestone for a Regenerating Oven and Process for Selectively Loading Limestone in a Regenerating Oven Using Such Device," filed Sep. 13, 2007, which is a 371 of International Patent Application No. PCT/IT2006/000178, titled "Device for Selectively Dispensing Limestone for a Regenerating Oven and Process for Selectively Loading Limestone in a Regenerating Oven Using Such Device," filed Mar. 22, 2006, which claims priority from Italian Patent Application No. TO2005A000230 filed Apr. 7, 2005, the contents of which are incorporated in this disclosure by reference in their entirety.

BACKGROUND INFORMATION

1. Field of the Invention

The present invention refers to a device for selectively dispensing limestone for regenerating ovens. The present invention further refers to a process for selectively loading limestone in a regenerating oven using such device.

2. Background Art

As known, parallel-flow regenerating ovens for manufacturing lime from limestone are composed of two vats, which are mutually interconnected through a connection channel.

Limestone is loaded in every vat and descends along the pre-heating area, in which regenerative heat exchange occurs in counter-current with fumes, passes the lances, which insert fuel and arrives to the baking/calcining area. From here, it reaches the lime cooling area.

The oven operation allows the alternate combustion in every vat with a combustion cycle which is 8 to 12 minutes long.

During every alternate combustion cycle, fuel is entered into the vat under combustion through the lances, and burns in the combustion air, which is blown into the vat, releasing heat, which is partly absorbed by the limestone calcining. Simultaneously, cooling air is entered at the base of every vat in order to cool the lime. The cooling air of the vat under combustion, together with combustion gases and carbon dioxide released from the limestone when calcining, pass through the transverse interconnected channel, reaching the other vat at a temperature up to 1050° C., in which they are mixed with cooling air at the base and rise, thereby heating the limestone which can be found in the heating area.

In traditional ovens, however, combustion gases rise along the vat through the limestone by travelling, due to their own physical nature, along the short trajectory, namely the one flanking the internal wall of each vat, making the heating of crosses limestone irregular.

SUMMARY OF THE INVENTION

Object of the present invention is solving the above prior art problems, by providing a device for selectively dispensing limestone for regenerating ovens which allows loading each vat by dividing the limestone depending on its size or granulometric curve, in such a way as to create a lower-resistance path defined for the combustion fumes circuit.

Another object of the present invention is providing a process for selectively loading limestone in a regenerating oven using the selective dispensing device according to the present invention.

The above and other objects and advantages of the invention, as will appear from the following description, are reached with a device for selectively dispensing limestone for regenerating ovens as claimed in claim 1.

Moreover, the above and other objects and advantages of the invention are reached with a process for selectively loading limestone in a regenerating oven using the selective dispensing device as claimed in claim 8.

Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
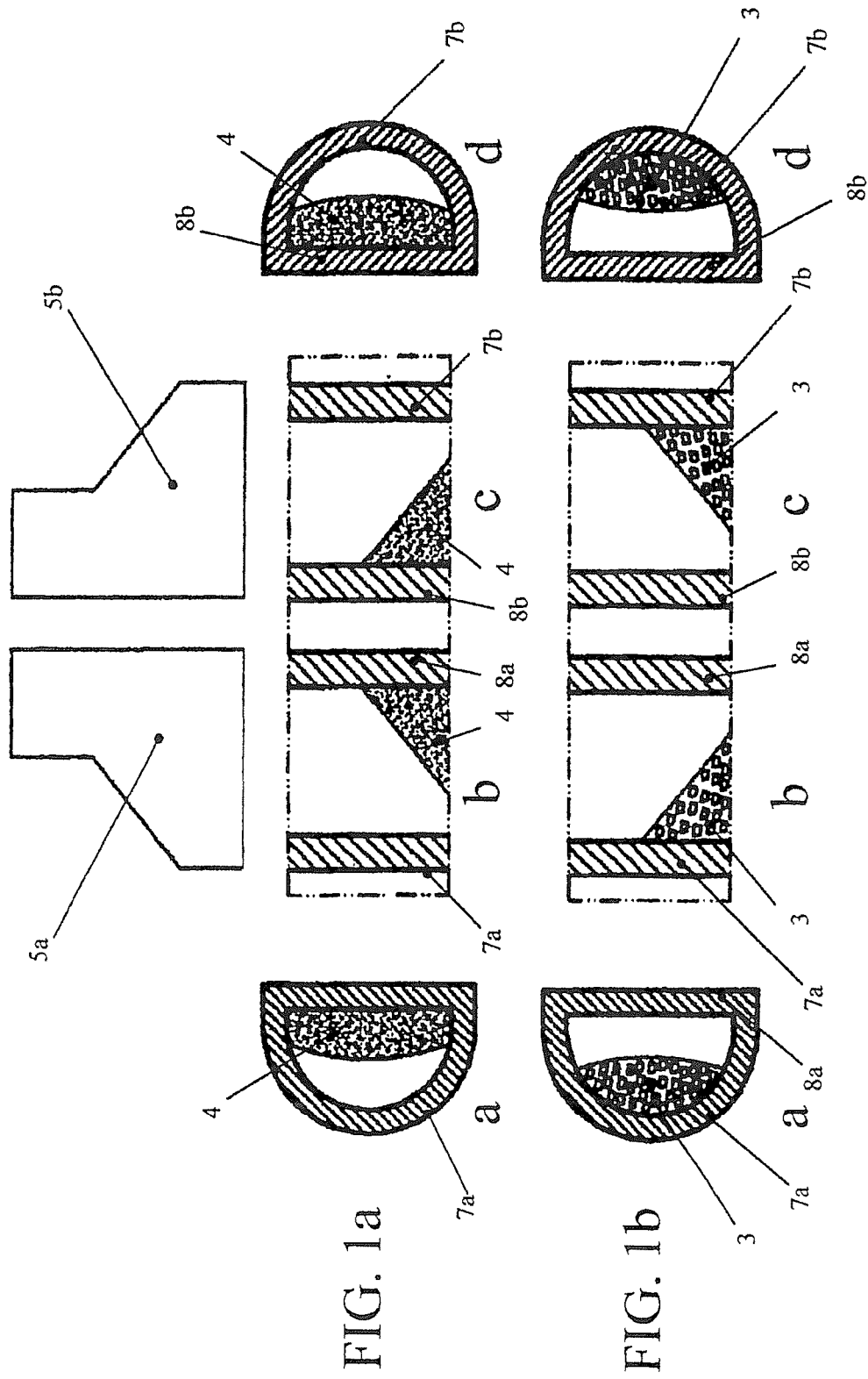
FIGS. 1a and 1b show various longitudinal sections of vats of a regenerating oven schematically showing the modes for filling with limestone using the selective dispensing device according to the present invention.

With reference to FIGS. 1a and 1b, and in particular to representations a, b, c, d which show the loading modes with limestone respectively of a first vat 5a with a top view, of the first vat 5a with side sectional view, of a second vat 5b with top view, of the second vat 5b with side sectional view, it is possible to note that the scope of the selective dispensing device 1 according to the present invention is allowing to load with limestone each vat of a regenerating oven creating a lower-resistance path to descending/ascending flow of combustion fumes towards the top of each vat, advantageously arranging the limestone with greater sizes 3 next to the external walls 7a, 7b (as shown in representations a, b, c, d of FIG. 1b) and limestone with smaller sizes 4 next to the internal walls 8a, 8b (as shown in representations a, b, c, d of FIG. 1a) of each vat 5a, 5b. In fact, since limestone with greater sizes has interstices with bigger sizes among the granules once having been loaded in the vat with respect to existing sizes among granules with smaller sizes, which are arranged more compactly one with respect to the others, fumes will find a lower-resistance path next to the external wall, consequently travelling, when rising towards the limestone, along a longer path, consequently releasing a greater amount of heat, and in a more homogeneous way.

Figure 2:
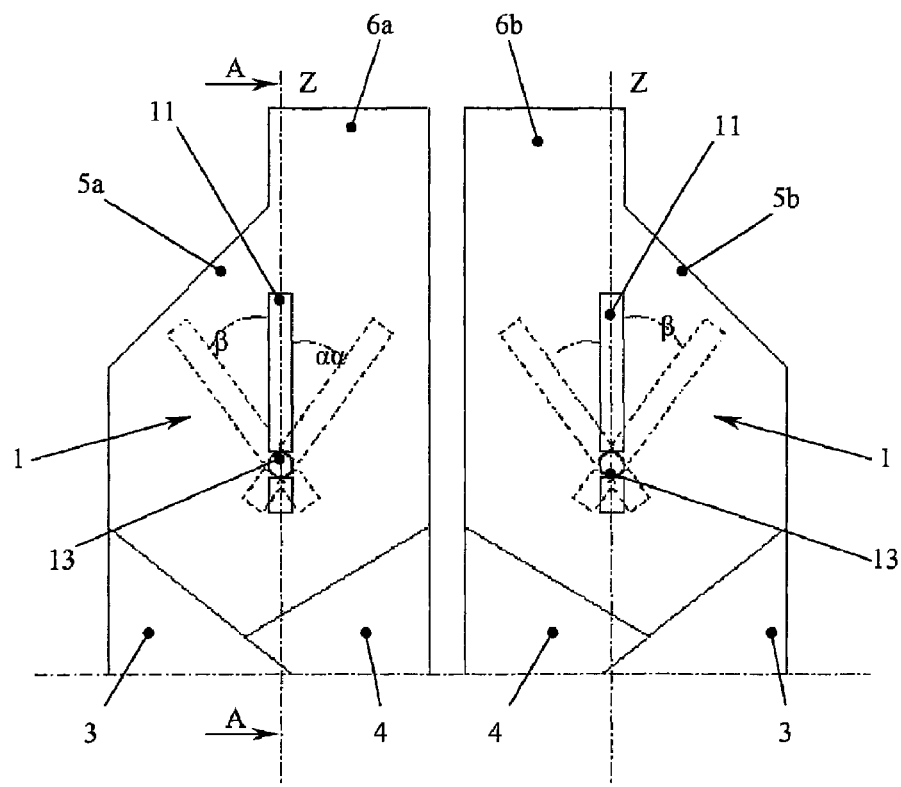
FIG. 2 shows a front sectional view of a regenerating oven equipped with the device for selectively dispensing limestone according to the present invention.

In order to obtain the above described results, and with reference to FIG. 2, it is possible to provide each vat 5a, 5b, next to its own hood, with a selective dispensing device 1 for limestone according to the present invention, as will be described below.

To obtain a more efficient use of the selective dispensing device 1 according to the present invention, it would be preferable to previously provide an operation for separating limestone in order to divide it depending on granule sizes into at least one batch with greater sizes and one batch with smaller sizes. The oven, and in particular each vat 5a, 5b, is then loaded through the top 6a, 6b of each vat 5a, 5b by a loading system (not shown) comprising at least one first line for loading limestone with greater sizes and at least one second line for loading limestone with smaller sizes. Preferably, loading occurs in each vat 5a, 5b through an alternate supply from the first loading line and the second loading line.

Figures 3A, 3B:
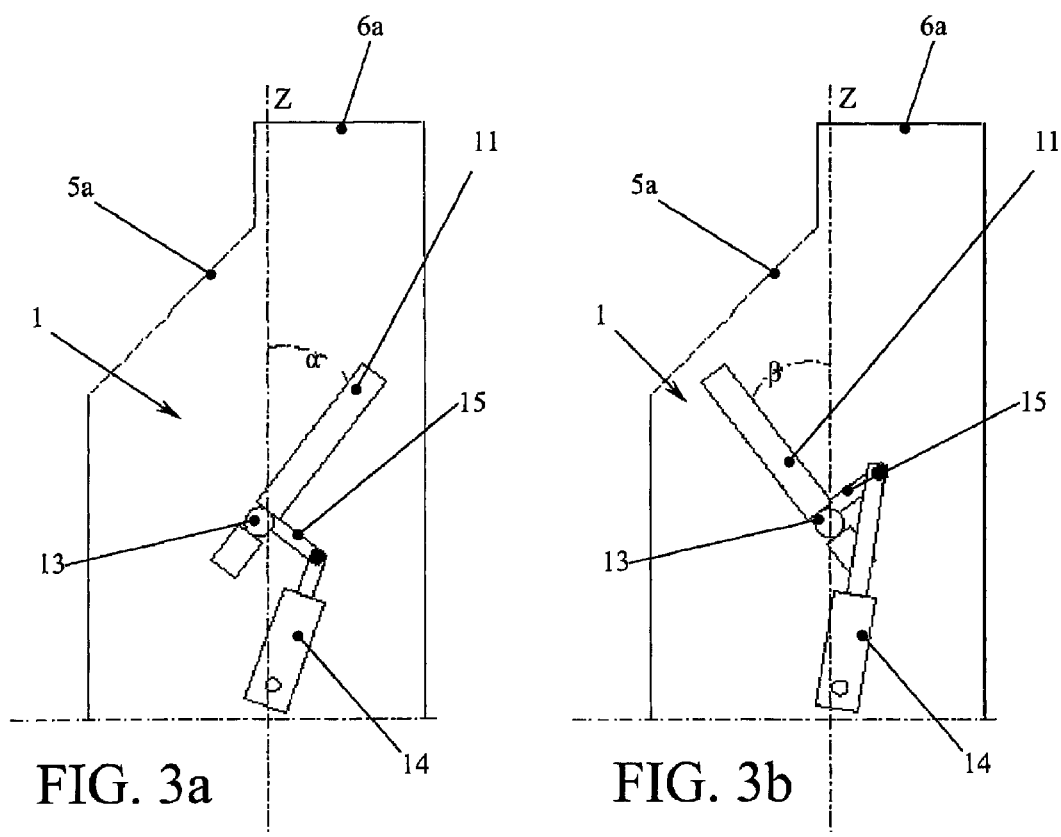
FIGS. 3a and 3b show a side sectional view of a vat of the oven in FIG. 2 in different operating positions.
Figure 4:
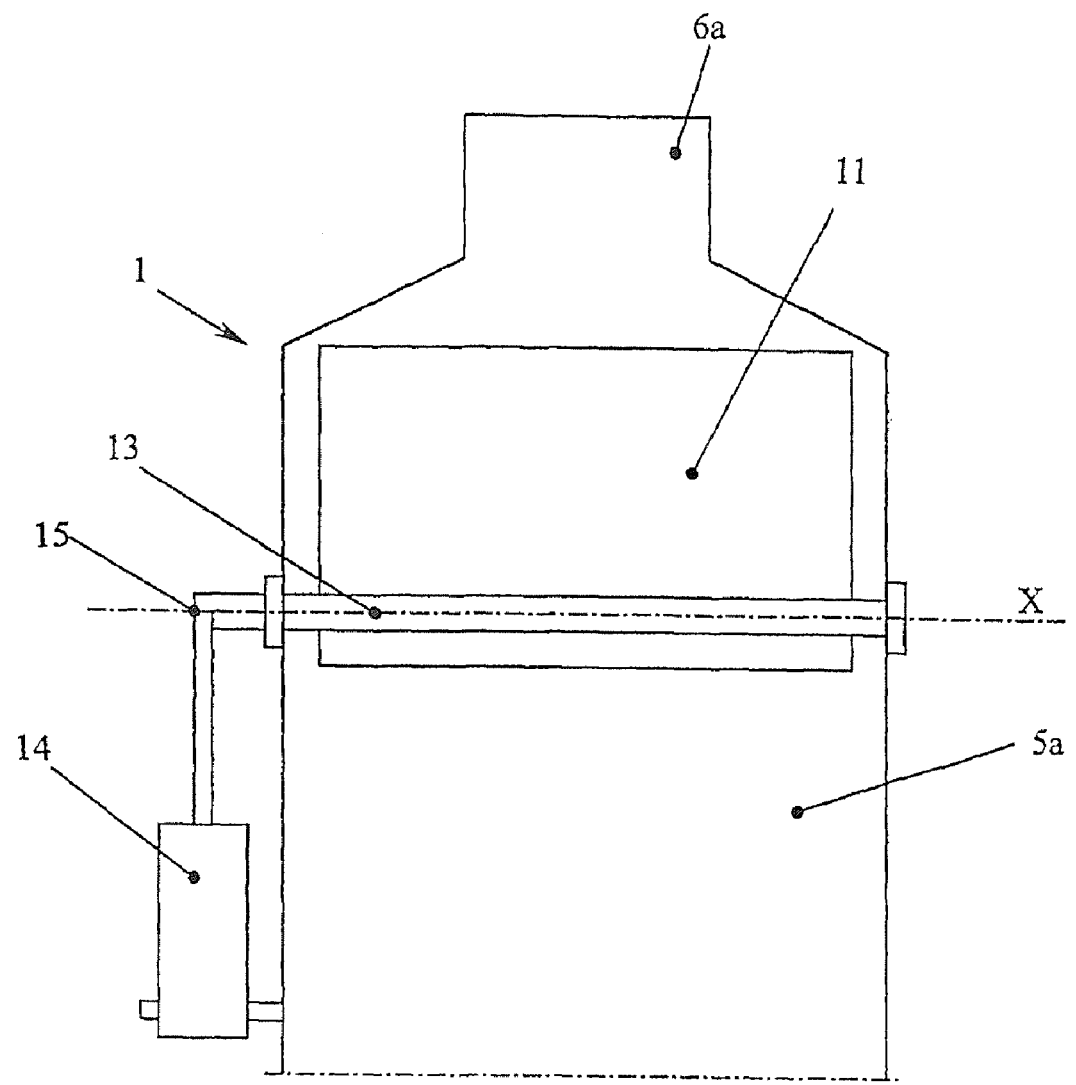
FIG. 4 shows another side sectional view of the vat of FIGS. 3a and 3b along the sectional plan A-A.

With reference now further to FIGS. 3a, 3b and 4, it is possible to note that the selective dispensing device 1 according to the present invention comprises at least one mobile bulkhead 11, connected to a drive shaft 13 rotating around a rotation axis X, such rotation being driven by an actuator system, mentioned below; in particular, the mobile bulkhead 11 can rotate around the rotation axis X in order to be alternatively inclined by a first angle α and by a second angle β with respect to a reference plane Z (inclined positions are shown dashed in FIG. 2), such plane being preferably vertical and passing by the rotation axis X.

In order to obtain the selective loading of limestone in each vat 5a, 5b, it is therefore enough to provide that, when the vat 5a, 5b is supplied by the first loading line, the actuator system takes care of inclining the mobile bulkhead 11 by the first angle α (as shown in FIG. 3a) in such a way as to address and arrange the limestone with greater sizes against the external wall 7a, 7b of the vat 5a, 5b itself; when instead the vat 5a, 5b is supplied by the second loading line, the actuator system takes care of inclining the mobile bulkhead 11 by the second angle β (as shown in FIG. 3b) in such a way as to address and arrange the limestone with smaller sizes against the internal wall 8a, 8b of the vat 5a, 5b itself.

Obviously, the absolute values of the first and second angle α, β can be adjusted depending on limestone sizes granulometry and their respective rest angle, in such a way as to guarantee the most efficient selective loading according to the present invention for each vat 5a, 5b.

Always with reference to FIGS. 3a and 3b, it is possible to note that the actuator system comprises an actuating piston 14, such as a double-effect cylinder of the pneumatic, hydraulic or oleo-dynamic type, connected to a bracket 15 of the drive shaft 13 substantially perpendicular to the rotation axis X; in such a way, when the actuating piston 14 cylinder performs its stroke along a direction, the mobile bulkhead 11 is inclined by the first angle α, while when the actuating piston 14 cylinder performs its stroke along the opposite direction, the mobile bulkhead 11 is inclined by the second angle β. The actuator system can obviously further comprise drive and control means of the actuating piston 14 which, depending on which loading line is supplying each vat, impose the related correct inclination to the mobile bulkhead 11.

It would be preferable, due to obvious actuator system managing and operating reasons, that the absolute values of the first and the second angle were the same, namely |α|=|β|: in such case, the mobile bulkhead 11 will be alternatively inclined by an angle +α and −α with respect to the reference plane Z.

The previous description has been made with reference to the Figures considering the reference plane Z as substantially vertical: it is however clear that the above described statements can be wholly applied also in case a substantially horizontal reference plane is taken into account, though this latter one is technically less practical to realise, due to reduced spaces available inside the vats 5a, 5b for placing an horizontal mobile bulkhead.

The present invention further refers to a process for selectively loading limestone in a regenerating oven using the selective dispensing device according to the present invention; in particular, the inventive process comprises the steps of:

separating limestone in order to divide it, depending on granules sizes, into at least one batch with greater sizes and one batch with smaller sizes;

inclining the mobile bulkhead 11 by the first angle α with respect to the reference plane Z through the actuator system;

supplying a top 6a, 6b of the vat 5a, 5b through the first line for loading limestone with greater sizes;

inclining the mobile bulkhead 11 by the second angle β with respect to the reference plane Z through the actuator system;

supplying the top 6a, 6b of the vat 5a, 5b through the second line for loading limestone with smaller sizes;

repeating the previous steps till the vats 5a, 5b have been suitably filled with limestone.

We claim:

1. A method for manufacturing lime for limestone, the method comprising:
    a) providing a regenerating oven for manufacturing lime from limestone, the oven comprising at least one vat, where the vat comprises a top, a bottom, an external wall connecting the top and the bottom and an internal wall connecting the top and the bottom, where the external wall is longer than the internal wall, and where the vat further comprises a device for selectively dispensing limestone granules either toward the external wall of the vat or toward the internal wall of the vat, the device comprising:
        i) at least one mobile bulkhead connected to a drive shaft rotating around a rotation axis X allowing the mobile bulkhead to selectively incline by a first angle and by a second angle with respect to a reference plane Z coincident with a plane of the bulkhead when the bulkhead is not inclined; and
        ii) an actuator system connected to the mobile bulkhead for driving the rotation of the drive shaft;
    b) dividing a load of limestone granules into a first batch of limestone granules and a second batch of limestone granules, where the first batch of limestone granules has a greater size than the second batch of limestone granules;
    c) actuating the actuator to incline the mobile bulkhead by the first angle;
    d) loading either the first batch of limestone granules into the vat or the second batch of limestone granules into the vat;
    e) actuating the actuator to incline the mobile bulkhead by the second angle;
    f) loading a remaining batch of limestone granules into the vat; and
    g) heating the limestone generating combustion fumes, and allowing the combustion fumes to preferentially travel along the external wall of the vat;
    where steps c) through f) arrange more of the first batch of limestone granules against the external wall of the vat than against the internal wall, and arrange more of the second batch of limestone granules against the internal wall of the vat than against the external wall which creates a lower-resistance path to a flow of the combustion fumes towards the top of the vat along the external wall of the vat as compared to along the internal wall of the vat; and where allowing the combustion fumes to preferentially travel along the external wall of the vat releases a greater amount of heat in a more homogeneous way through the limestone granules than would be released if the limestone granules were not arranged before heating according to steps c) through f).

2. The method of claim 1, where the reference plane Z is parallel to the internal wall of the vat.

3. The method of claim 1, where the actuator system comprises an actuating piston connected to a bracket of the drive shaft substantially perpendicular to the rotation axis X, and where the method further comprises having the actuating piston cylinder perform a stroke along a first direction thereby inclining the mobile bulkhead by the first angle, and then having the actuating piston cylinder perform a stroke along a second opposing direction thereby inclining the mobile bulkhead by the second angle.

4. The method of claim 1, where the actuator system further comprises drive and control means for controlling the inclination to the mobile bulkhead.

5. The method of claim 1, where the absolute value of the first angle with respect to the reference plane Z equals the absolute value of the second angle with respect to the reference plane Z.

6. The method of claim 1, where the absolute value of the first angle with respect to the reference plane Z does not equal the absolute value of the second angle with respect to the reference plane Z.

7. The method of claim 1, further comprising repeating steps c) through f).

* * * * *